3,031,483
METHOD OF PRODUCING ORGANIC TIN COMPOUNDS AND PREPARATIONS CONTAINING SUCH COMPOUNDS FOR COMBATING NOXIOUS MICRO-ORGANISMS
Martinus Johannes Koopmans, Van Houtenlaan, Weesp, Netherlands, assignor to North American Philips Company, Inc., New York, N.Y., a corporation of Delaware
No Drawing. Filed Nov. 13, 1958, Ser. No. 773,566
Claims priority, application Netherlands Nov. 18, 1957
15 Claims. (Cl. 260—429.7)

It is known that organic tin compounds of the general structure

in which $R_1$, $R_2$ and $R_3$ may be equal or different and represent alkyl groups with 1 to 12 carbon atoms, phenyl groups or phenyl groups substituted by a chlorine atom or a bromine atom, and Q represents one of the following groups: Cl; Br; J; CN; $OCOCH_3$; $OCOC_5H_{11}$; $OCOC_6H_5$; $OC_6H_5$; $OC_6H_4.NO_2(p)$; $SO_2.C_6H_4.CH_3(p)$;

$$NH.SO_2.C_6H_4.CH_3(p)$$

$NH.SO_2CH_3$; $CH_2CN$;

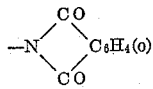

or

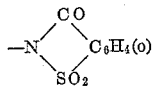

have biocide and in particular, fungicide and bactericide properties.

On testing and using a number of these tin compounds for combating moulds and bacteria, hereinafter termed "micro-organisms," on plants it was found that the use of a quantity required for destroying these micro-organisms often caused much damage to leaves and stems of treated plants. These phytotoxic effect is often inhibitive to the use of said organo-tin compounds, for example for combating mould diseases of plants, and may result in that plants, in order to prevent them from being attacked by particular species of micro-organisms, have to be treated with means which are not exactly suitable for this purpose.

It has now been found that novel organo-tin compounds of the formula $(R)_3Sn.O.R_4$, in which $(R)_3$ represents the groups $R_1$, $R_2$ and $R_3$ referred to hereinafter and $R_4$ stands for an organic acyl group or sulfonyl group, of which one of the hydrogen atoms linked to carbon is replaced by an acylamino group, have a satisfactory fungicide and bactericide effect and, moreover, little phytotoxic effect.

The present invention concerns a method of producing novel organo-tin compounds and is characterized in that compounds of the general formula

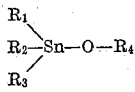

in which $R_1$, $R_2$ and $R_3$ represent equal or different, whether or not branched, alkyl-, aralkyl- or aryl groups, and $R_4$ represents an aliphatic, mixed aliphatic-aromatic or aromatic acyl group or an aliphatic, mixed aliphatic-aromatic or aromatic sulfonyl group, in which one of the hydrogen atoms linked to carbon is substituted by an acylamino group, are produced in an appropriate manner.

For the groups $R_1$, $R_2$ and $R_3$, which may be equal or different, there come into account alkyl groups with 1 to 12 carbon atoms, notably those with 1 to 5 carbon atoms, for example methyl-, ethyl-, propyl- and isopropyl groups and in particular butyl groups, further aralkyl groups, for example benzyl groups and aryl groups, such as tolyl- and halogen phenyl groups, for example chloro-phenyl groups and in particular phenyl groups. If $R_1$, $R_2$ and $R_3$ are alkyl groups, compounds are to be preferred in which the total number of carbon atoms of these groups does not exceed 18.

Of particular importance are the symmetrical trialkyl-, triaralkyl- and triaryl compounds, which are to be understood to mean compounds in which $R_1$, $R_2$ and $R_3$ are equal to one another and in particular symmetrical trialkyl compounds, in which the alkyl group contains 1 to 5 carbon atoms and is, for example, a methyl-, ethyl-, propyl- and isopropyl group and in particular a butyl group. Further the symmetrical triphenyl compound is of particular importance.

The acyl group $R_4$, in which one of the hydrogen atoms linked to carbon is replaced by an acylamino group, may originate from a saturated or unsaturated aliphatic carboxylic acid, for example formic acid, acetic acid, propionic acid, butyric acid, valeric acid, capronic acid, lauric acid, palmitic acid, stearic acid or crotonic acid, oleic acid and preferably from acetic acid or from a mixed aliphatic-aromatic carboxlic acid, for example phenyl-acetic acid, phenyl-propionic acid, phenyl-butyric acid or from an aromatic acid, such as benzoic acid or α- or β-naphthoic acid.

Excellent results are obtained with compounds, in which $R_4$ represents an acetyl group or a benzoyl group, in which one of the carbon-linked hydrogen atoms is replaced by an acyl-amino group.

The sulfonyl group $R_4$, in which one of the carbon-linked hydrogen atoms is replaced by an acylamino group, may originate from a saturated or unsaturated aliphatic sulfonic acid, for example ethane sulfonic acid or from a mixed aliphatic-aromatic sulfonic acid such as phenyl-ethylsulfonic acid or from an aromatic sulfonic acid such as benzene sulfonic acid and 4-methylbenzene sulfonic acid. Particularly the two last-mentioned compounds come into account.

The acyl group of the acylamino group, may originate from a saturated or unsaturated aliphatic carboxylic acid such as formic acid, acetic acid, propionic acid, butyric acid, valeric acid, capronic acid, lauric acid, palmitic acid, stearic acid or crotonic acid, oleic acid or from a mixed aliphatic-aromatic carboxylic acid such as phenyl-acetic acid, phenyl-propionic acid or from an aromatic acid, for example benzoic acid.

In particular, compounds, in which the acylamino group is an acetylamine group, are interesting.

The method according to the invention is in particular of importance for producing, for example, trimethyltin-, triethyltin-, tripropyltin-, tri-isopropyltin-, tributyltin- and triphenyltin-acetylamino acetate, -4-acetylamino-benzoate and -4-acetylaminobenzenesulfonate.

The compounds according to the invention can be produced in many different ways. In general, methods analogous to those described for preparing organo-tin compounds, which do not contain acylamino groups, may be used. In the present case, particularly those methods of this kind are of importance, which use an organo-tin compound containing the organic groups hereinbefore represented by $R_1$, $R_2$ and $R_3$ and into which the organic group $R_4$, which already contains the acylamino group, are introduced.

A suitable method is particularly that in which an organo-tin oxide or tin hydroxide of the structure $(R)_3Sn.O.Sn(R)_3$ and $(R)_3SnOH$ respectively, in which (R)$_3$ represents the aforesaid groups R$_1$, R$_2$ and R$_3$ is reacted with a carboxylic acid or sulfonic acid, in which one of the carbon-linked hydrogen atoms is replaced by an acylamino group.

A further method is, for example, that in which the compound (R)$_3$.Sn.X, in which (R)$_3$ represents the aforesaid groups R$_1$, R$_2$ and R$_3$, and X represents a halogen atom, for example chlorine, is reacted with a salt, for example a sodium salt, of a carboxylic acid or sulfonic acid, in which one of the carbon hydrogen atoms is replaced by an acylamino group.

Methods for producing compounds according to the invention are described in the following examples.

EXAMPLE 1

Tributyltin-4-Acetylaminobenzoate

A mixture of 20.9 gms. of tributyl tinoxide and 12.5 gms. of 4-acetylaminobenzoic acid was distilled with 175 ccs. of benzene. After removing the water at normal pressure, the mixture was concentrated by evaporation to dryness in vacuo at a maximum temperature of 100° C. The solid residue yielded 21.5 g. of tributyl tin-4-acetylaminobenzoate after crystallising twice from acetone. Melting point 153° C. to 154° C.

EXAMPLE 2

Triphenyltin-4-Acetylaminobenzoate

A mixture of 37 gms. of triphenyltinhydroxide and 18 gms. of 4-acetylaminobenzoic acid was warmed together with 250 ccs. of benzene on a waterbath for approximately one hour. Subsequently, the benzene was first distilled at normal pressure and finally in vacuo. The solid residue (approximately 50 gms.) was crystallised from one litre of toluene. Yield of crystalline triphenyltin-4-acetylaminobenzoate 40 gms. Melting point 219° C. to 220° C. (with decomposition).

EXAMPLE 3

Tributyltinacetylaminoacetate

A mixture of 120 gms. of tributyltinoxide and 47 gms. of acetylaminoacetic acid was dissolved, by heating, in approximately 750 ccs. of benzene. In order to remove any water formed approximately one-third of the benzene was distilled at normal pressure. Subsequently, the solution was filtered hot and further concentrated by evaporation in vacuo. The residue was a syrup which crystallised slowly. Yield of tributyltinacetylaminoacetate 152 gms. Melting point 113.5° C. to 118° C.

Recrystallisation from cyclohexane yielded 120 gms. of a purer product having a melting point of 117° C. to 120.5° C. (Analysis: experimental 29.60% of Sn. Calculated for C$_{16}$H$_{33}$O$_3$NSn: 29.23% of Sn.)

EXAMPLE 4

Triphenyltinacetylaminoacetate

A mixture of 11 gms. of triphenyltinhydroxide and 3.5 gms. of acetylamino acetic acid was distilled with 75 ccs. of benzene. The solvent was partially removed at normal pressure and finally entirely in vacuo. Residue: 13.5 gms. of a powder which was crystallised from 125 ccs. of toluene. The pure triphenyltinacetylamino acetate thus obtained (yield 11.5 gms.) melted at 160.5° C. with decomposition. (Analysis: experimental 25.46% of Sn; calculated for C$_{22}$H$_{21}$O$_3$NSn: 25.45% of Sn.)

EXAMPLE 5

Tributyltin-4-Acetylamino Benzenesulfonate

Equivalent quantities of tributyltinoxide and 4-acetylaminobenzenesulfonic acid, 24 gms. and 17.5 gms. respectively, were together dissolved in a mixture of 150 ccs. of absolute alcohol. After distilling off these solvents, the residue was several times crystallised from acetone. Thus yielded 28 gms. of tributyltin-4-acetylaminobenzenesulfonate, melting point 130° C. to 136° C. (with decomposition). (Analysis: experimental 22.74% of Sn; calculated for C$_{20}$H$_{35}$O$_4$NSn: 23.54% of Sn.)

The invention further consists in a method of producing a preparation comprising an organo-tin compound for combating micro-organisms and in particular moulds, characterized in that a compound of the general formula

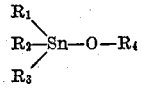

in which R$_1$, R$_2$, R$_3$ and R$_4$ have the aforesaid meaning, is mixed with solid or fluid carrier materials and, if desired, surface-active materials, dispersion agents and/or adhesives.

The invention also concerns the combating of noxious micro-organisms, in particular of plant-parasitic moulds with the aid of compounds according to the invention or preparations containing one or more of these compounds as effective constituent. For combating these pests the effective compound may be distributed over the plants in the form of an emulsion, a suspension or a powder.

The compounds coming into account can be worked up in several ways into fungicide and/or bactericide preparations. Possible forms are:

(a) Miscible oils with 5% to 20% of active constituent, 5% to 10% of non-ionogenic emulsifier of a mixture thereof with anion-active emulsifier, rest solvents (essentially ketones such as cyclohexanone);

(b) Aerosols, for example containing acetone, methylethylketone and cyclohexanone as solvents, and methylchloride or Freon as "propellent";

(c) Wettable powders with 50% to 80% of active substance and in addition wetting agents such as fat alcohol sulphates or alkylarylsulfonates, and dispersion agents and/or an inert carrier such as kaolin, chalk, pipe clay, whether or not conditioned with colloidal silicic acid;

(d) Dusts, for example with 5% of active substituent, in a mixture of kieselguhr and magnesium marlstone;

(e) Seed protectors with, for example, 50% of the effective substituent in combination with kaolin with the addition of adhesives, for example spindle oil.

A suitable method of producing a wettable powder is the following:

50 gms. of triphenyltin-4-acetylaminobenzoate are mixed with 7 gms. of sodium-ligninsulfonate as a dispersion agent, 3 gms. of sodiumcetylsulfonate and 40 gms. of kaolin, the mixture subsequently being ground in a pin mill to an average particle size of approximately 10µ.

For producing a dusting powder 10% by weight of wettable powder, produced as before, may be mixed homogeneously with 90% by weight of talcum powder.

The means according to the invention are inter alia particularly suitable for combating moulds, for example phytophthora, on potato plants.

Of several compounds according to the invention the fungitoxic effect and the phytotoxic effect on leaves and stems of plants was determined as follows in separate tests.

*Test A1.*—Comparison of the phytotoxicity of tributyltin-4-acetylamino benzoate and tributyltinbenzoate.

Young bush bean plants, the first two leaves of which had just developed, were sprayed with a solution of tributyltin-4-acetylaminobenzoate or of tributyltinbenzoate in acetone. The solutions contained 0.1% by weight or 0.3% by weight of the tin compounds. A quantity of the solution corresponding to 10 ccs. per 1000 sq./cm. foliage surface was used. After several days the damage stated in Table I—as a percentage of the total leave surface—was observed.

The tests were carried out in twofold.

Spraying the plants with a quantity of acetone as used in carrying out the aforesaid tests does not cause damage to the foliage.

TABLE I

Phytotoxicity of Tributyltin-4-Acetylaminobenzoate (BAAB) and Tributyltinbenzoate (BB)

| Concentration of solution in percent by weight | Damage in percent to leaves of bush beans | |
| --- | --- | --- |
| | BAAB | BB |
| 0.3 | 39 | 95 |
| 0.1 | 17 | 67 |

Test A2.—Comparison of fungicide activity of tributylin-4- acetylaminobenzoate and tributyltinbenzoate.

Of these compounds the fungicide activity with respect to *Fusarium culmorum* was determined by spore germination tests.

This activity was expressed as ED 50, that is the quantity of the active compound causing about 50% reaction in the test object (here stated as the concentration of the effective substance in its aqueous suspension). For tributyltin-4-acetylaminobenzoate ED was 50: 0.3 mg./l.; for tributyltinbenzoate it was 0.5 mg./l.

From the results of both tests it has been found that by introducing an acetylamino group, the phytotoxicity is considerably diminished, while the fungicide activity is even enhanced.

Test B1.—Comparison of the phytotoxicity of triphenyltin-4-acetylaminobenzoate and triphenyltinbenzoate.

Similarly as in Test A1, young plants of nasturtium with approximately 11 leaves were sprayed with acetonic solutions containing 0.3%, 0.1% and 0.03% of the tin compound respectively. After a few days the percentage damage to the leaves was determined.

The results are listed in Table II.

TABLE II

Phytotoxicity of Triphenyltin-4-Acetylaminobenzoate (PAAB) and of Triphenyltinbenzoate (PB)

| Concentration of solution in percent by weight | Damage in percent to leaves of nasturtium | |
| --- | --- | --- |
| | PAAB | PB |
| 0.3 | 38 | 95 |
| 0.1 | 22 | 88 |
| 0.03 | 21 | 53 |

Test B2.—Comparison of fungicide activity of triphenyltin-4-acetylaminobenzoate and triphenyltinbenzoate.

Similarly as in Test A2, the fungicide activity of these compounds in spore germination tests was determined with regard to *Fusarium culmorum*. This activity, expressed as ED 50 (see above) was for: triphenyltin-4-acetylaminobenzoate 0.8 mg./l. and for triphenyltinbenzoate 1.0 mg./l.

Also in this case it is found that introduction of an acetylamino group results in considerably decreasing the phytotoxicity, while enhancing the fungicide activity also in this case.

What is claimed is:

1. Organo-tin compounds of the general structural formula

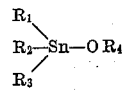

wherein $R_1$, $R_2$ and $R_3$ are each members of the group consisting of phenyl, chlorophenyl, tolyl, benzyl and alkyl radicals containing from 1 to 12 carbon atoms and $R_4$ is a monoacylamino substitution product of a member selected from the group consisting of the saturated aliphatic, unsaturated aliphatic, aromatic and mixed aliphatic-aromatic acyls and sulfonyls of monocarboxylic acids wherein the acylamino group replaces a carbon linked hydrogen atom.

2. The compounds of claim 1 wherein $R_1$, $R_2$ and $R_3$ are identical.
3. The compounds of claim 2, wherein $R_1$, $R_2$ and $R_3$ are butyl groups.
4. The compounds of claim 2 wherein $R_1$, $R_2$ and $R_3$ are phenyl groups.
5. The compounds of claim 2 wherein $R_4$ is an acylaminoacetyl group.
6. The compounds of claim 2 wherein $R_4$ is a 4-acylaminobenzoyl group.
7. The compounds of claim 2 wherein $R_4$ is a 4-acylaminobenzenesulfonyl group.
8. The compounds of claim 2 wherein the acylamino group is an acetylamino group.
9. Tributyltinacetlyaminoacetate.
10. Triphenyltinacetylaminoacetate.
11. Tributyltin-4-acetylaminobenzoate.
12. Triphenyltin-4-acetylaminobenzoate.
13. Tributyltin-4-acetylaminobenzenesulfonate.
14. A method of producing organo-tin compounds of the general structural formula

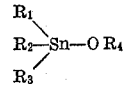

wherein $R_1$, $R_2$ and $R_3$ are each members of the group consisting of phenyl, chlorophenyl, tolyl, benzyl and alkyl hadicals containing from 1 to 12 carbon atoms and $R_4$ is a monoacylamino substitution product of a member selected from the group consisting of the saturated aliphatic, unsaturated aliphatic, aromatic and mixed aliphatic-aromatic acyls and sulfonyls of monocarboxylic acids wherein the acylamino group replaces a carbon linked hydrogen atom wherein the method employed comprises reacting a compound of the general formula HO—$R_4$ with a compound selected from the group consisting of

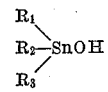

and

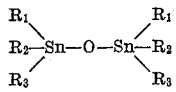

wherein $R_1$, $R_2$, $R_3$ and $R_4$ each have the aforesaid meaning.

15. The method of claim 14 wherein the reaction is carried out in the presence of an aromatic hydrocarbon solvent selected from the group consisting of benzene, toluene and xylene and at least part of the solvent is distilled off during the reaction to remove the water formed during the reaction.

References Cited in the file of this patent

UNITED STATES PATENTS

| | | |
| --- | --- | --- |
| 2,329,884 | Daskais | Sept. 21, 1943 |
| 2,330,239 | Prutton | Sept. 28, 1943 |
| 2,489,518 | Burt | Nov. 29, 1949 |
| 2,507,055 | Smith et al. | May 9, 1950 |
| 2,560,034 | Eberly | July 10, 1951 |
| 2,586,191 | Wasserman | Feb. 19, 1952 |
| 2,731,482 | Stefl | Jan. 17, 1956 |

(Other references on following page)

UNITED STATES PATENTS

| | | |
|---|---|---|
| 2,731,484 | Best | Jan. 17, 1956 |
| 2,745,820 | Mack | May 15, 1956 |
| 2,779,703 | Crouch | Jan. 29, 1957 |
| 2,820,053 | Hotten | Jan. 14, 1958 |
| 2,873,287 | Ramsden | Feb. 10, 1959 |
| 2,873,288 | Rosenberg | Feb. 10, 1959 |

FOREIGN PATENTS

| | | |
|---|---|---|
| 582,977 | Canada | Sept. 8, 1959 |
| 553,869 | Belgium | Apr. 15, 1957 |

OTHER REFERENCES

"Hackh's Chemical Dictionary," 3rd ed., 1944, Maple Press Co., York, Pa., page 18 relied on.